United States Patent [19]

Ballard

[11] Patent Number: 4,638,423
[45] Date of Patent: Jan. 20, 1987

[54] EMULATING COMPUTER

[75] Inventor: Danny B. Ballard, Scottsdale, Ariz.

[73] Assignee: Motorola, Inc., Schaumburg, Ill.

[21] Appl. No.: 708,632

[22] Filed: Mar. 6, 1985

[51] Int. Cl.[4] .................................. G06F 15/20
[52] U.S. Cl. .................................. 364/200
[58] Field of Search ... 364/200 MS File, 900 MS File

[56] References Cited

U.S. PATENT DOCUMENTS

| 3,891,974 | 6/1975 | Coulter et al. | 364/200 |
| 4,370,709 | 1/1983 | Fosdick | 364/200 |
| 4,415,969 | 11/1983 | Bayliss et al. | 364/200 |

*Primary Examiner*—Raulfe B. Zache
*Attorney, Agent, or Firm*—Raymond J. Warren

[57] ABSTRACT

An apparatus and method is disclosed for providing an emulating computer. The present invention consists of a computer having a storage area, processing unit, control circuits and translation circuit. The original instructions are first loaded into the storage area. When the processor attempts to operate an instruction the control circuit loads a section of the instructions into the translating circuit. These instructions are then translated and stored in a memory area of the translating circuit having the address of the original instruction. The processor unit then accesses the storage area and retrieves the translated instruction.

22 Claims, 3 Drawing Figures

EMULATING COMPUTER

BACKGROUND OF THE INVENTION

1. Field of the Invention

This invention relates, in general, to computers and, more particularly, to emulating computers.

2. Description of the Background

A growing problem in the field of computers is derived in trying to replace existing computers with newer, faster acting, higher periormance computers. This is particularly a problem in areas that have well established software used in such a widespread network that developing a new software is impractical. The existing means for accomplishing these changes in computers is to change the basic microcode of the new computer so that it will operate with the existing software. This process, however, can be costly and can prevent the new computer from utilizing its new and improved capabilities.

SUMMARY OF THE INVENTION

Accordingly, it is an object of the present invention to provide an emulating computer and method of emulating various digital computer instruction sets and operations that will overcome the above deficiencies.

A further object of the present invention is to provide an emulating computer and method of operation that allows the utilization of a large amount of existing software without extensive changes required due to hardware upgrades.

Still another object of the present invention is to provide an emulating computer that is more economical to implement.

Yet another object of the present invention is to provide an emulating computer and method of operation that allows direct mapping of a computer instruction set into the instruction set of a target machine.

The above and other objects and advantages of the present invention are provided by an apparatus and method of translating blocks of existing software to software that can be utilized by the emulating computer while the computing process is functioning. The emulating computer has a storage area, processor, control circuit and translation circuit. The original instructions are loaded into the storage area. When the processor attempts to execute an instruction the control circuit loads a section of the instructions into the translation circuit. These instructions are then translated and stored in a memory area of the translating circuit having the address of the original instruction. The processor then accesses the storage area and retrieves the translated instruction.

A particular embodiment of the present invention consists of an emulating computer having first and second address busses and a data bus. The emulating computer comprises: a memory means for storage of instructions and data; a processing means for processing an emulated instruction; a control means for controlling the flow of instructions and data through the emulating computer; and a translating means for translating the instructions. The memory means has a data bus coupled to the data bus of the emulating computer and an address bus coupled to the first address bus of the emulating computer. The processing means has a data bus coupled to the data bus of the emulating computer; an address bus coupled to the first address bus of the emulating computer; and a control line. The control means has a first address bus being coupled to the first address bus of the emulating computer; a second address bus being coupled to the second address bus of the emulating computer; and a control line being coupled to the control line of the processing means. The translating means has a first address bus being coupled to the the address bus of the emulating computer; a second address bus being coupled to the second address bus of the emulating computer; and a data bus being coupled to the data bus of the emulating computer.

DETAILED DESCRIPTION OF THE DRAWINGS

Figure 1:
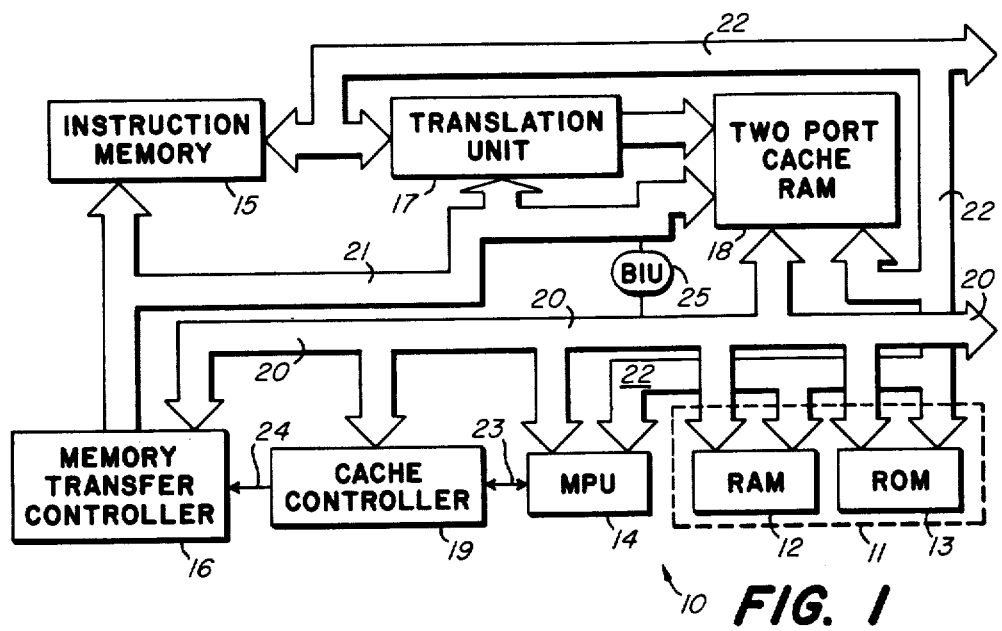
FIG. 1 is a block diagram of a computer embodying the present invention.

Referring to FIG. 1 a block diagram of a computer, generally designated 10, embodying the present invention is illustrated. Computer 10 consists of memory 11, having a RAM 12 (Random Access Memory), such as the MB 8464 produced by Fujitsu, and a ROM 13 (Read Only Memory), such as the 27256 manufactured by INTEL; an MPU 14 (Microprocessing Unit such as the MC 68020 Produced by Motorola Inc.); an instruction memory 15, such as the MB 8464 manufactured by Fujitsu; a memory transfer controller 16, such as the 68450 manuiactured by Motorola, Inc.; a translation unit 17; a two port cache RAM 18, such as the HM 6147 LP manuiactured by Hitachi; a cache controller 19 (normally a custom CMOS LSI design); and first and second address buses, 20 and 21 respectively, and a data bus 22 connecting the various parts.

In this example the emulated computer will be reierred to as an AN/UYK-20, or UYK-20. However, it should be noted that various other computers may be emulated by this device and it is possible to have the present invention emulate more than one computer.

In operation the UYK-20 instructions and data are provided to the computer by address bus 20 and data bus 22 from either external storage; from storage in memory 11; or from a combination of both. The UYX-20 data and instructions, when entered from outside computer 10, are stored in RAM 12. When a program is run, or function is to be performed, by the computer, MPU 14 receives the address of the first UYK-20 instruction. The address of the first UYK-20 instruction is loaded into MPU 14 as part of the program loading procedure. MPU 14 will then attempt to fetch the initial instruction checking to see if the translated instruction is located in cache RAM 18. Cache controller 19 monitors address bus 20 and determines if the desired instruction is located in cache RAM 18. If the desired instruction is not in cache RAM 18, cache controller 19 will initiate the transfer of a block of N words of UYK-20 instructions from memory 11 into instruction memory 15. These UYK-20 instructions are then processed, one at a time, through translation unit 17, which will be discussed in more detail in conjunction with FIG. 2 below, and stored in cache RAM 18. Cache RAM 18 is designed to contain M words where $M > N$ so that when translation unit 19 has processed all of the words from instruction memory 15 there will be a reserve of words in cache RAM 18 while the next block is loaded and translated. Transfer controller 16 will continue to transfer words through translation unit 17 to cache RAM 18 until cache RAM 18 is full. This transfer is accomplished using address bus 21. After the first translated instruction has been stored in cache RAM 18, cache controller 19 will inform MPU 14, along a control line 23, and MPU 14 shall begin execution of the instructions.

Execution of the translated instructions occurs concurrently with the instruction transfer and translation process which requires cache controller 19 and transfer controller 16 to operate in parallel with MPU 14 controlling the flow of data. As a result of the concurrent translation and operation of instructions little time is lost between the entering of the untranslated instructions and the operation of the computer. The faster operation of the emulating computer, as compared to those being replaced, will have an end result of requiring less time to process the same programs as the original computer.

A no match signal line 24 provides the communication of status between cache controller 19 and memory transfer controller 16. If all of the instructions have been translated then memory transfer controller 16 is instructed to move the next block of instructions to instruction memory 15.

If data is contained in the block of N words transferred to instruction memory 15 it will not be translated and will be routed directly from instruction memory 15 to cache RAM 18 via data bus 22.

When MPU 14 attempts to execute an instruction not in cache RAM 18 (e.g. a branch or jump instruction or the next sequential address is located outside the cache address) the previous steps of loading a block of words into instruction memory 15 and translating them is performed. If, in the process of running the program, it is necessary to read or write data from the UYK-20 instruction space, cache controller 19 will disable translation unit 17 and the system shall perform the required transfer by activating bus interface unit (BIU) 25 (normally a custom CMOS LSI design) to provide the appropriate connections. In this manner data can be retrieved along address bus 20; transferred through BIU 25 to address bus 21 and stored directly in instruction memory 15.

Figure 2:
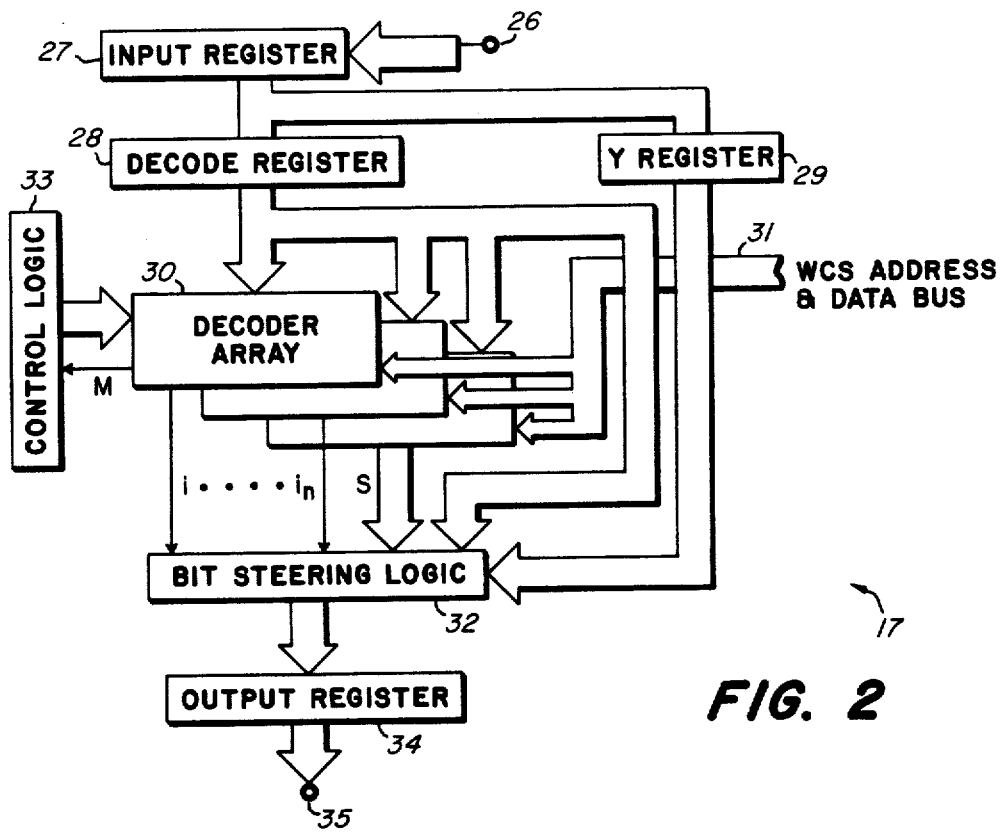
FIG. 2 is a block diagram of a translation unit utilized by the computer of FIG. 1.

Referring now to FIG. 2, a block diagram of a translation unit, generally designated 17, utilized in the computer of FIG. 1 is illustrated. Translation unit 17 receives an instruction at a node 26 from instruction memory 15 (FIG. 1). The instruction is then stored in an input register 27, such as the 74S374 manufactured by Texas Instruments, Inc. The first word of the instruction, one instruction may consist of several machine language words, is moved to a decode register 28, such as the 74S378. If the instruction consists of more than one word, the second word is moved to a buffer register 29, such as the 74S374. The second word is typically used to store immediate data or an absolute address which does not need to be translated. The output of decoder 28 is next applied to a decoder array 30, such as the HM 6147 LP manufactured by Hitachi. Decoder array 30 can be constructed of either ROMS, for application where only a single computer is to be emulated, or of RAMS to form a writeable control store (WCS). A writeable control store's address and data bus lines 31 are coupled separate controller, not shown, to decoder array 30. When the type of computer to he emulated has been determined the controller loads the appropriate translation into decoder array 30.

The output of decoder array 30 consists of three fields of control lines. First, the instruction, I, field provides the translated instruction to a bit steering logic circuit 32 (normally a custom combinational logic circuit). Bit steering logic circuit 32 is required to place all of the translated words of the instruction in the Proper order. Second, the instruction count, M, field which contains the numher of contiguous ROM or WCS instructions necessary to form the emulation processor instruction sequence which is required to implement the decoded instruction. The N field lines are coupled to a control logic circuit 33 (normally a custom combinational logic circuit) which accesses the contiguous emulation instruction in the WCS. This field is necessary because each input instruction can map into several emulation instructions. Finally, the bit steering, S, field is used to steer the decoded instruction bits and undecoded bits from decode register 28 to the appropriate bit field of an output register 34, such as the 74S374. Output register 34 then transmits the emulating instruction to a node 35 which is coupled to cache RAM 18 of FIG. 1.

Figure 3:
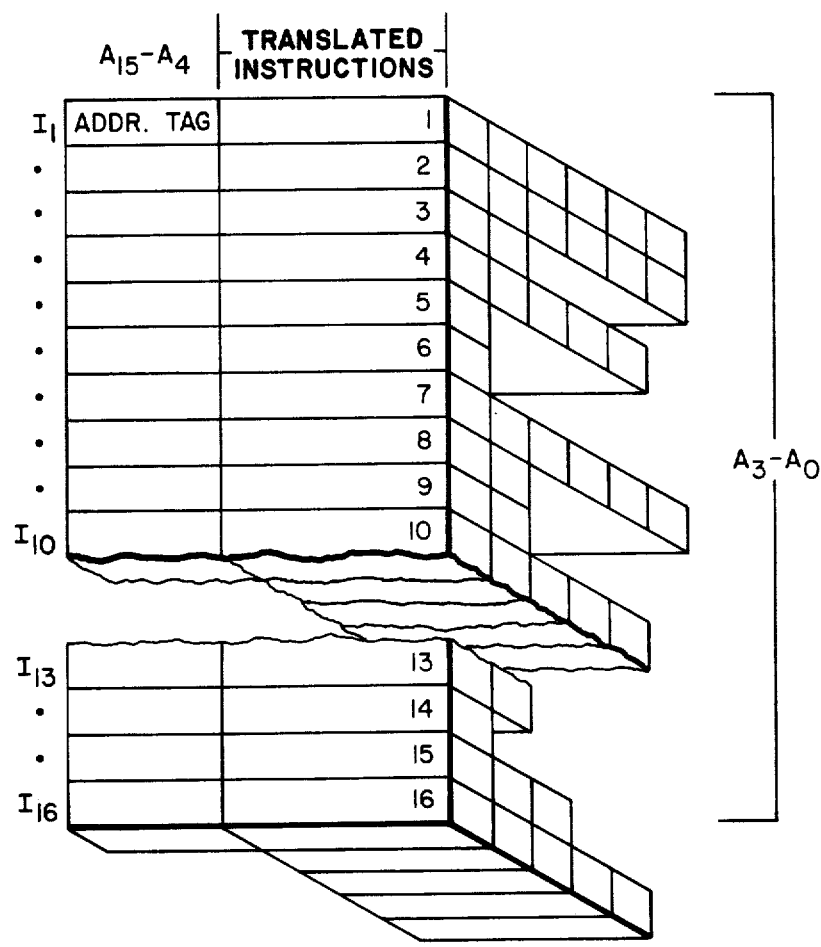
FIG. 3 illustrates the translated instruction produced by the translation unit of FIG. 2.

Referring now to FIG. 3 an illustration of the translated instruction produced in FIG. 2 is shown. As each instruction is received by the translation unit, the address tag associated with that instruction's physical address in the instruction memory is appended to translated instruction. Every translated instruction mapped from a given instruction must also be associated with that address tag. When MPU 14 addresses a memory location the cache controller checks to see if that memory location is cached (by periorming a match on the address tag fields). If the referenced address is not cached then the cache controller 19 directs the memory transfer controller 16 to move that address (and the following N contiguous addresses) into the cache memory 18 via the translation unit 17.

In operation the address of the first untranslated instruction is loaded into MPU 14 as part of the loading procedure. MPU 14 will then attempt to retrieve the initial instruction by checking to see if the translated instruction is located in cache RAM 18. Cache controller 19 monitors the address bus activity of MPU 14 and determines if the desired instruction is in cache RAM 18. If the desired instruction is not in cache RAM 18, cache controller 19 will initiate transfer of N words of untranslated instructions through translation unit 17 and into cache RAM 18. Memory transfer controller 16 will then transfer the instructions through translation unit 17 until cache RAM 18 is full. After the first translated instruction has been stored in cache RAM 18, cache controller notifies MPU 14 which will begin execution of that instruction. When MPU 14 attempts to execute an instruction that is not in cache RAM 18 the process of transferring a block of untranslated instructions and translating them will be repeated. If an attempt is made to read or write data from emulating computer 10, cache controller 19 will disable translation unit 17 and the system shall perform the required transfer by the appropriate connection of BIU 25.

Thus, it is apparent that there has been provided in accordance with the invention, an emulating computer and method of operation that fully satisfies the objects, aimes and advantages set forth above.

It has been shown that the present invention provides an apparatus and method of emulating various digital computer instruction sets and operations without extensive changes required due to hardware upgrades.

While the invention has been described in conjunction with specific embodiments thereof, it is evident that many alterations, modifications, and variations will be apparent to those skilled in the art in light of the foregoing description. Accordingly, it is intended to embrace all such alterations, modifications and variations in the appended claims.

What is claimed is:

1. An emulating computer device having a first address bus, a second address bus and a data bus, said emulating computer device comprising:

memory means for storage of instruction and data, said memory means having a data bus and an address bus, said data bus being coupled to said data bus of said emulating computer device and said address bus being coupled to said first address bus of said emulating computer device;

processing means for processing an emulating instruction, said processing means having a data bus, an address bus and a control line, said data bus being coupled to said data bus of said emulating computer device and said address bus being coupled to said first address bus of said emulating computer device;

a cache controller having a control line, a no match line, and an address bus, said control line being coupled to said control line of said processing means and said address bus being coupled to said first address bus of said emulating computer device;

a memory transfer controller having a no match line, a first address bus and a second address bus, said no match line being coupled to said no match line of said cache controller and said first and second address buses being coupled to said first and second address buses of said emulating computer device;

an instruction memory having an address bus and a data bus, said address bus being coupled to said second address bus of said emulating computer device and said data bus being coupled to said data bus of said emulating computer device;

an input register having an input and output, said input being coupled to said data bus of said emulating computer device;

a decode register having an input and an output, said input being coupled to said output of said input register;

a buffer register having an input and an output, said input being coupled to said output of said input register;

a decoder array having an input, a control input, a control output, an output and a steering output, said input being coupled to said output of said decode register;

a control logic circuit having an input and an output, said input being coupled to said control output of said decoder array and said output being coupled to said control input of said decoder array;

a bit steering circuit having a first input, a steering input, a second input, a third input and an output, said first input being coupled to said output of said decoder array, said steering input being coupled to said steering output of said decoder array, said second input being coupled to said output of said decode register and said third input being coupled to said output of said buffer register;

an output register having an input and an output, said input being coupled to said output of said bit steering circuit; and a cache random access memory having a first data bus, a second data bus, a first address bus and a second address bus, said first data bus being coupled to said data bus of said emulating computer device, said first address bus being coupled to said first address bus of said emulating computer device, said second data bus being coupled to said output of said output register and said second address bus being coupled to said second address bus of said emulating computer device.

2. The emulating computer device of claim 1 further comprising a bus interface unit having a first bus and a second bus, said first bus being coupled to said first bus of said emulating computer device and second device being coupled to said second address bus of said emulating computer device.

3. The emulating computer device of claim 2 wherein said memory means comprises:

a random access memory having an address bus and a data bus, said address bus being coupled to said first address bus of said emulating computer device and said data bus being coupled to said data bus of said emulating computer device; and a read only memory having an address bus and a data bus, said address bus being coupled to said first address bus of said emulating computer device and said data bus being coupled to said data bus of said emulating computer device.

4. The emulating computer device of claim 3 wherein said processing means comprises a microprocessor unit having an address bus, a data bus and a control line, said address bus being coupled to said first address bus of said emulating computer device, said data bus being coupled to said data bus of said emulating computer device and said control line being coupled to said control line of said cache controller.

5. The emulating computer device of claim 1 wherein said memory means comprises:

a random access memory having an address bus and a data bus, said address bus being coupled to said first address bus of said emulating computer device and said data bus being coupled to said data bus of said emulating computer device; and a read only memory having an address bus and a data bus, said address bus being coupled to said first address bus of said emulating computer device and said data bus being coupled to said data bus of said emulating computer device.

6. The emulating computer device of claim 5 wherein said processing means comprises a microprocessor unit having an address bus, a data bus and a control line, said address bus being coupled to said first address bus of said emulating computer device, said data bus being coupled to said data bus of said emulating device and said control line being coupled to said control line of said cache controller.

7. A method of emulating a computer comprising the steps of:

transmitting an instruction to a processing unit;
  checking a cache memory for a translated instruction;
  loading an instruction block into an instruction memory if said translated instruction is not in said cache memory;
  translating an instruction of said instruction block providing a translated instruction;

storing said translated instruction in said cache memory; and transmitting said translated instruction from said cache memory to said processing unit.

8. The method of claim 7 wherein said step of translating an instruction comprises the steps of:
loading said instruction into an input register;
loading said instruction from said input register into a decode register and loading data into a buffer register;
transmitting said instruction to a decode array from said decode register;
providing said translated instruction corresponding to said instruction;
transmitting said translated instruction to a bit steering circuit from said decode array;
transmitting said translated instruction from said bit steering circuit to an output register; and
transmitting said translated instruction from said output register to said cache memory.

9. An emulating computer device having a first address bus, a second address bus and a data bus, said emulating computer device comprising:
memory means for storage of instructions and data, said memory means having a data bus and an address bus, said data bus being coupled to said data bus of said emulating computer device and said address bus being coupled to said first address bus of said emulating computer device;
processing means for processing an emulated instruction, said processing means having a data bus, an address bus and a control line, said data bus being coupled to said data bus of said emulating computer device and said address bus being coupled to said first address bus of said emulating computer device;
control means for controlling the flow of instructions and data through said emulating computer device, said control means having a first address bus, a second address bus and a control line, said first and second address buses being coupled to said first and second address buses of said emulating computer device and said control line being coupled to said control line of said processing means; and
translating means for translating said instructions, said translating means having a first address bus, a second address bus and a data bus, said first and second address buses being coupled to said first and second address buses of said emulating computer device and said data bus being coupled to said data bus of said emulating computer device.

10. The emulating computer device of claim 9 further comprising a bus interface unit having a first bus and a second bus, said first bus being coupled to said first address bus of said emulating computer device and said second bus being coupled to said second address bus of said emulating computer device.

11. The emulating computer device of claim 10 wherein said memory means comprises:
a random access memory having an address bus and a data bus, said address bus being coupled to said first address bus of said emulating computer device and said data bus being coupled to said data bus of said emulating computer device; and
a read only memory having an address bus and a data bus, said address bus being coupled to said first address bus of said emulating computer device and said data bus being coupled to said data bus of said emulating computer device.

12. The emulating computer device of claim 11 wherein said processing means comprises a microprocessor unit having an address bus, a data bus and a control line, said address bus being coupled to said first address bus of said emulating computer device, said data bus being coupled to said data bus of said emulating computer device and said control line being coupled to said control line of said control means.

13. The emulating computer device of claim 12 wherein said control means comprises:
a cache controller having a control line, a no match line, and an address bus, said control line being coupled to said control line of said processing means and said address bus being coupled to said first address bus of said emulating computer device; and
a memory transfer controller having a no match line, a first address bus and a second address bus, said no match line being coupled to said no match line of said cache controller, said first and second address buses being coupled to said first and second address buses of said emulating computer device.

14. The emulating computer device of claim 13 wherein said translating means comprises:
an instruction memory having an address bus and a data bus, said address bus being coupled to said second address bus of said control means and said data bus being coupled to said data bus of said emulating computer means;
a translator having a first data bus and a second data bus, said first data bus being coupled to said data bus of said emulating computer device; and
a cache memory having a first data bus, a second data bus, a first address bus and a second address bus, said first data bus being coupled to said data bus of said emulating computer device, said first address bus being coupled to said first address bus of said emulating computer device, said second data bus being coupled to said second data bus of said translator and said second address bus being coupled to said second address bus of said emulating computer device.

15. The emulating computer device of claim 14 wherein said translator comprises:
an input register having an input and an output, said input being coupled to said data bus of said emulating computer device;
a decode register having an input and an output, said input being coupled to said output of said input register;
a buffer register having an input and an output, said input being coupled to said output of said input register;
a decoder array having an input, a control input, a control output, an output and a steering output, said input being coupled to said output of said decode register;
a control logic circuit having an input and an output, said input being coupled to said control output of said decoder array and said output being coupled to said control input of said decoder array;
a bit steering circuit having a first input, a steering input, a second input, a third input and an output, said first input being coupled to said output of said decoder array, said steering input being coupled to said steering output of said decoder array, said second input being coupled to said output of said decode register and said third input being coupled to said output of said buffer register; and an output register having an input and output, said input being coupled to said output of said bit steering circuit and said output being coupled to said second data bus of said cache memory.

16. The emulating computer device of claim 15 wherein said cache memory consists of a two port cache random access memory.

17. The emulating computer device of claim 10 wherein said memory means comprises:

a random access memory having an address bus and a data bus, said address bus being coupled to said first address bus of said emulating computer device and said data bus being coupled to data bus of said emulating computer device; and a read only memory having an address bus and a data bus, said address bus being coupled to said first address bus of said emulating computer device and said data bus being coupled to data bus of said emulating computer device.

18. The emulating computer device of claim 17 wherein said processing means comprises a microprocessor unit having an address bus, a data bus and a control line, said address bus being coupled to said first address bus of said emulating computer device, said data bus being coupled to said data bus of said emulating computer device and said control line being coupled to said control line of said control means.

19. The emulating computer device of claim 18 wherein said control means comprises:

a cache controller having a control line, a no match line, and an address bus, said control line being coupled to said control line of said processing means and said address bus being coupled to said first address bus of said emulating computer device; and a memory transfer controller having a no match line, a first address bus and a second address bus, said no match line being coupled to said no match line of said cache control line, said first address bus being coupled to said first address bus of said emulating computer device and said second address bus being coupled to said second address bus of said emulating computer device.

20. The emulating computer device of claim 19 wherein said translating means comprises:

an instruction memory having an address bus and a data bus, said address bus being coupled to said second address bus of said emulating computer device and said data bus being coupled to said data bus of said emulating computer means;

a translator having a first data bus and a second data bus, said first data bus being coupled to said data bus of said emulating computer device; and a cache random access memory having a first data bus, a second bus, a first address bus and a second address bus, said first data bus being coupled to said data bus of said emulating computer device, said first address bus being coupled to said first address bus of said emulating computer device, said second data bus being coupled to said second data bus of said translator and said second address bus being coupled to said second address bus of said emulating computer device.

21. The emulating computer device of claim 20 wherein said translator comprises:

an input register having an input and an output, said input being coupled to said data bus of said emulating computer device;

a decode register having an input and an output, said input being coupled to said output of said input register;

a buffer register having an input and an output, said input being coupled to said output of said input register;

a decoder array having an input, a control input, a control output, an output and a steering output, said input being coupled to said output of said decode register;

a control logic circuit having an input and an output, said input being coupled to said control output of said decoder array and said output being coupled to said control input of said decoder array;

a bit steering circuit having a first input, a steering input, a second input, a third input and an output, said first input being coupled to said output of said decoder array, said steering input being coupled to said steering output of said decoder array, said second input being coupled to said output of said decode register and said third input being coupled to said output of said buffer register; and an output register having an input and output, said input being coupled to said output of said bit steering circuit and said output being coupled to said second data bus of said cache memory.

22. The emulating computer device of claim 21 wherein said cache memory consists of a two port cache random access memory.

* * * * *